United States Patent
Kim et al.

(10) Patent No.: US 8,628,878 B2
(45) Date of Patent: Jan. 14, 2014

(54) HOOKED RETAINER FOR ELECTRODE BODY IN RECHARGEABLE BATTERY

(75) Inventors: Sung-Bae Kim, Yongin-si (KR); Yong-Sam Kim, Yongin-si (KR); Sang-Won Byun, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 611 days.

(21) Appl. No.: 12/801,967

(22) Filed: Jul. 6, 2010

(65) Prior Publication Data

US 2011/0250491 A1  Oct. 13, 2011

Related U.S. Application Data

(60) Provisional application No. 61/282,859, filed on Apr. 12, 2010.

(51) Int. Cl.
*H01M 2/02* (2006.01)

(52) U.S. Cl.
USPC ........... 429/176; 429/211; 429/161; 429/180; 429/94; 429/208

(58) Field of Classification Search
USPC .................. 429/94, 161, 176, 180, 208, 211; 428/208
See application file for complete search history.

(56) References Cited

U.S. PATENT DOCUMENTS 5,658,683 A * 8/1997 Kageyama et al. ............. 429/94
2006/0024578 A1* 2/2006 Lee ............................... 429/208
2006/0057459 A1* 3/2006 Kwon et al. ................... 429/174
2007/0196729 A1  8/2007 Yamauchi et al.
2008/0038627 A1  2/2008 Yamauchi et al.

FOREIGN PATENT DOCUMENTS

| CN | 101145624(A) | | 3/2008 | |
|---|---|---|---|---|
| JP | 2006-040901 A | | 2/2006 | |
| JP | 2007-226989 A | | 9/2007 | |
| JP | 2008-066254 A | | 3/2008 | |
| KR | 10-2005-0049835 | * | 5/2005 | ............. H01M 2/04 |
| KR | 10 2006-0010482 A | | 2/2006 | |
| KR | 10-0637445 B1 | | 10/2006 | |

OTHER PUBLICATIONS

Machine English Translation of KR 10-2005-0049835 to Hong et al.*
Japanese Office Action in JP 2010-192487, dated Jul. 31, 2012 (Kim, et al.).
European Search Report in EP 11152639.8-1227, dated Jun. 29, 2011 (Kim, et al.).
Office Action issued in corresponding Korean application, 10-2010-0078849, dated Oct. 12, 2011.
Korean Notice of Allowance in KR 10-2010-0078849, dated Nov. 26, 2012 (Kim, et al.).
Japanese Notice of Allowance Dated Feb. 5, 2013.
Chinese Office Action dated May 6, 2013.

* cited by examiner

*Primary Examiner* — Carlos Barcena
*Assistant Examiner* — Michael Dignan
(74) *Attorney, Agent, or Firm* — Lee & Morse, P.C.

(57) ABSTRACT

A battery includes a case defining an inner space, the case having an inner wall, an electrode assembly in the inner space, the electrode assembly including an uncoated region, a lead tab configured to carry electricity, the lead tab being connected to the uncoated region, and a retainer, the retainer being joined to the lead tab and disposed between the electrode assembly and the inner wall, the retainer having a predetermined thickness.

15 Claims, 10 Drawing Sheets

HOOKED RETAINER FOR ELECTRODE BODY IN RECHARGEABLE BATTERY

CROSS-REFERENCE TO RELATED APPLICATION

This application claims priority to U.S. Provisional Application No. 61/282,859, filed in the U.S. Patent and Trademark Office on Apr. 12, 2010, and entitled "RECHARGEABLE BATTERY," which is incorporated by reference herein in its entirety and for all purposes.

BACKGROUND

1. Field

Embodiments relate to a rechargeable battery.

2. Description of the Related Art

A rechargeable battery may include a jelly-roll-type electrode assembly having a separator with an anode and a cathode disposed at both sides of the separator, a case housing the electrode assembly, a cap plate sealing an opening of the case, an electrode terminal electrically connected to the electrode assembly and protruded outside the cap plate through a terminal hole formed on the cap plate, and respective lead tabs connecting the cathode and the anode of the electrode assembly to the corresponding electrode terminals. The electrode assembly may have an uncoated region connected to the lead tab, and may be inserted into the case through the opening.

The above information disclosed in this Background section is only for enhancement of understanding of the background of the invention and therefore it may contain information that does not form the prior art that is already known in this country to a person of ordinary skill in the art.

SUMMARY

It is a feature of an embodiment to provide a rechargeable battery exhibiting resistance to vibration.

It is another feature of an embodiment to provide a rechargeable battery electrically insulating an electrode assembly from a case while providing for easy insertion of the electrode assembly into the case.

It is another feature of an embodiment to provide a rechargeable battery providing control of a position of the electrode assembly in the case.

At least one of the above and other features and advantages may be realized by providing a battery, including a case defining an inner space, the case having an inner wall, an electrode assembly in the inner space, the electrode assembly including an uncoated region, a lead tab configured to carry electricity, the lead tab being connected to the uncoated region, and a retainer, the retainer being joined to the lead tab and disposed between the electrode assembly and the inner wall, the retainer having a predetermined thickness.

The battery may include a first gap between the lead tab and an end of the inner wall, and the retainer may be disposed in the gap.

The battery may include a second gap between the lead tab and a side of the inner wall, and the retainer may be disposed in the second gap.

The retainer may be formed of an insulating material.

The retainer may be a monolithic unit formed of an insulating material.

The retainer may include an insulating material on a surface that contacts the inner wall.

The retainer may include a resilient member on a surface that faces the inner wall.

The resilient member may be a foam member, a spring, or an elastic member.

The retainer may be joined to the lead tab by at least one joining member

The joining member may be a hook.

The retainer may float against the inner wall.

The retainer may include a first joining member and a second joining member, the second joining member opposing the first joining member, and the retainer may grip the lead tab between the first joining member and the second joining member.

The first joining member may be a hook and the second joining member may be a hook.

The uncoated region may include a front side face and a rear side face, the lead tab may include a first current collector portion fixed to the front side face and a second current collector portion fixed to the rear side face, and the retainer may grip a body portion of the lead tab.

The lead tab may include at least one opening for receiving one of the first and second joining members of the retainer, and the one of the first and second joining members of the retainer may be disposed in the opening.

The opening may be a hole.

The uncoated region may include an end, and the lead tab may include a current collecting portion fixed to the end.

At least one of the above and other features and advantages may also be realized by providing a vehicle, including a power source, the power source providing a motive power for the vehicle, and at least one rechargeable battery configured to provide electricity to the power source, the at least one rechargeable battery including a case defining an inner space, the case having an inner wall, an electrode assembly in the inner space, the electrode assembly including an uncoated region, a lead tab configured to carry electricity, the lead tab being connected to the uncoated region, and a retainer, the retainer being joined to the lead tab and disposed between the electrode assembly and the inner wall, the retainer having a predetermined thickness.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
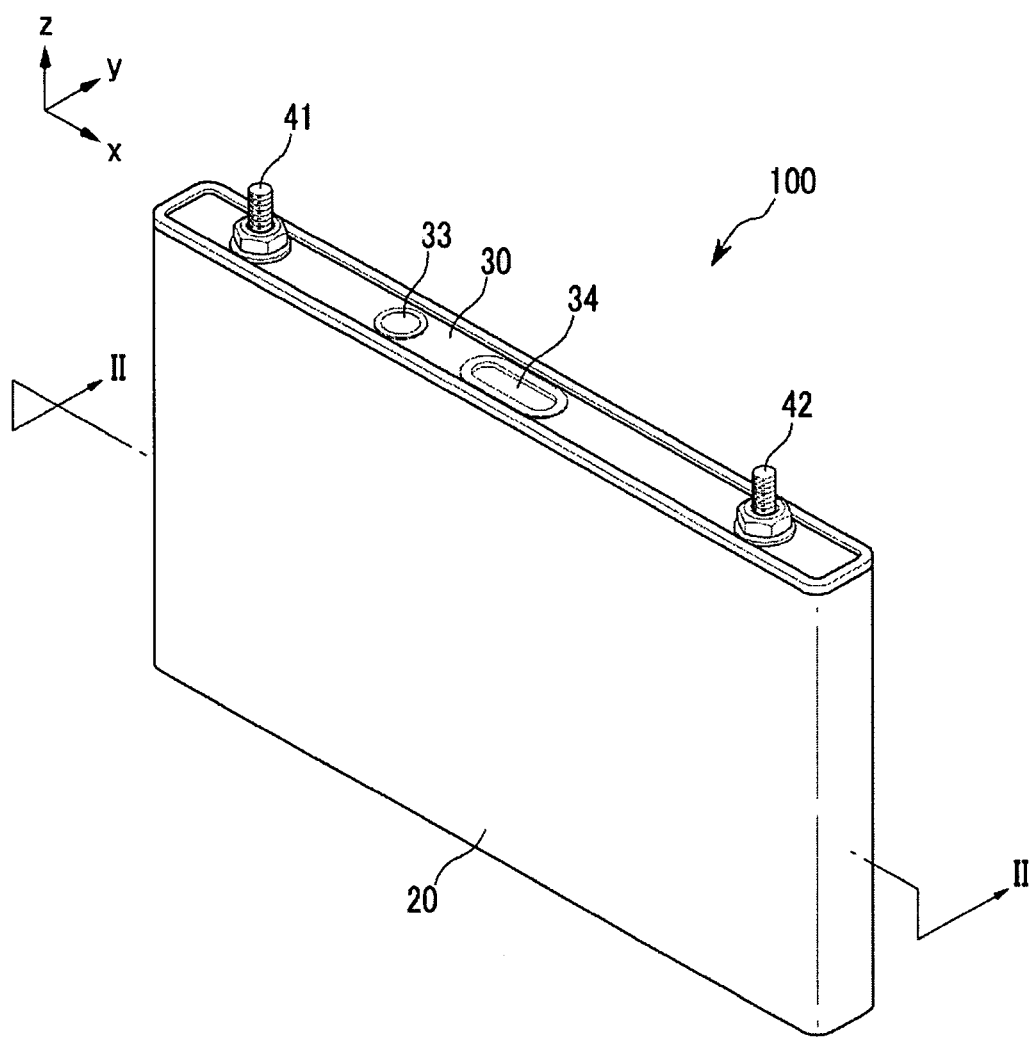
FIG. 1 illustrates a perspective view of a rechargeable battery according to a first example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 2:
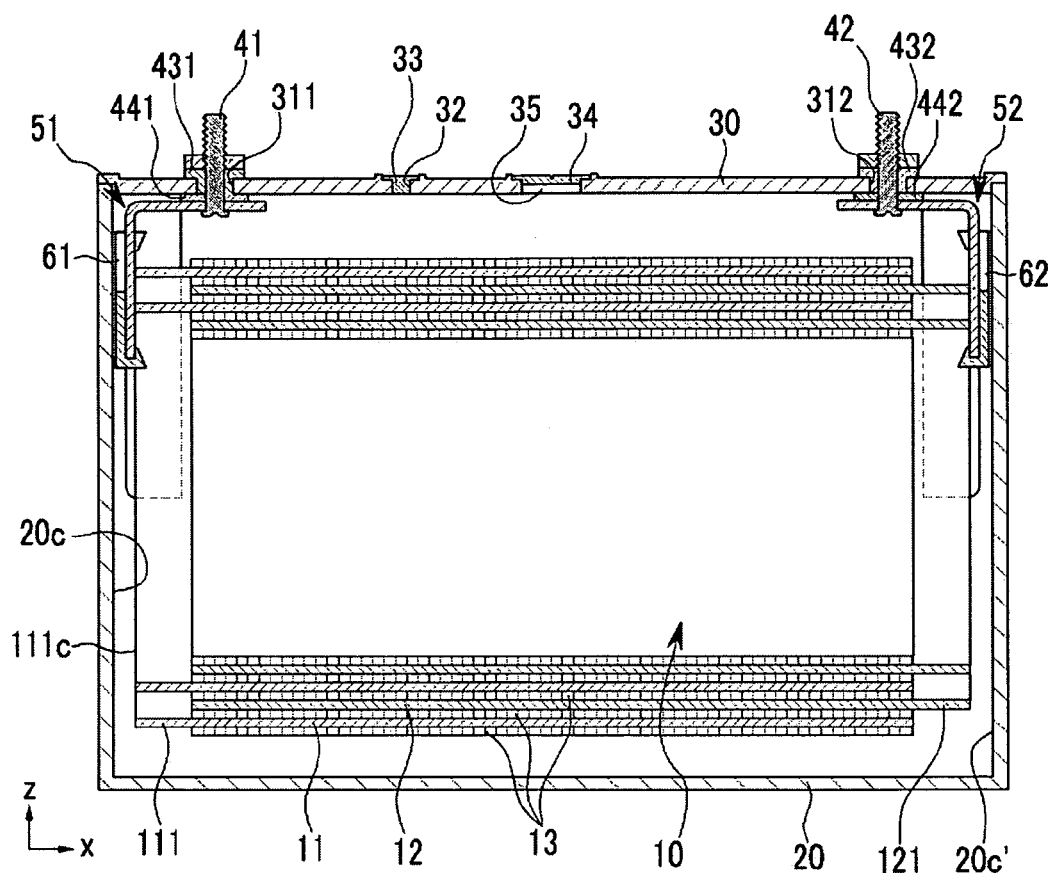
FIG. 2 illustrates a cross-sectional view in an X-Z plane with respect to a line II-II in FIG. 1.

FIG. 1 illustrates a perspective view of a rechargeable battery according to a first example embodiment, and FIG. 2 illustrates a cross-sectional view in an X-Z plane with respect to a line II-II in FIG. 1.

In the example shown in FIG. 1 and FIG. 2, a rechargeable battery 100 includes a case 20 having an electrode assembly 10, a cap plate 30 closing and sealing an opening formed at one end of the case 20, electrode terminals 41 and 42 installed in terminal holes 311 and 312 of the cap plate 30, lead tabs 51 and 52 connecting the electrode terminals 41 and 42 to the electrode assembly 10, a retainer 61 interposed between the lead tab 51 and an inner end wall 20c of the case 20, and a retainer 62 interposed between the lead tab 52 and another inner end wall 20c' of the case 20.

In the example shown in FIG. 1 and FIG. 2, the electrode assembly 10 includes a separator 13, which is an insulator, and an anode 11 and a cathode 12 disposed at both sides of the separator 13. The electrode assembly is formed in a jelly roll form by winding the anode 11, the cathode 12, and the separator 13. The anode 11 and the cathode 12 each include a current collecting part made of thin plate metal foil, and a respective active material coated on a surface of the respective current collecting part. Also, the anode 11 and the cathode 12 can be divided into a coated region (in which the active material is coated on the current collecting part), and uncoated regions 111 and 121 (without active material coated on the current collecting part). The coated regions form most of the anode 11 and the cathode 12 in the electrode assembly 10, and the uncoated regions 111 and 121 in the jelly roll state are disposed on both sides of the coated region. For example, the electrode assembly 10 in the jelly roll state forms an area with a wide front and rear, and the ends of the uncoated regions 111 and 121 form a narrow and long area (refer to FIG. 3), which is substantially a hexahedron.

In the example shown in FIG. 1 and FIG. 2, the case 20 forms the overall appearance of the rechargeable battery 100, and is formed with a conductive metal such as an aluminum, an aluminum alloy, or a nickel-plated steel. The case 20 provides a space for housing the electrode assembly 10. For example, the case 20 can be configured to be a hexahedron having an opening at one end so as to house the electrode assembly 10 that is hexahedral. The opening is oriented toward the top in FIGS. 1 and 2.

In the example shown in FIG. 1 and FIG. 2, the cap plate 30 is made of a thin plate, and is combined with the opening of the case 20 to close and seal the opening. The cap plate 30 blocks the inside of the closed and sealed case 20 from the outside. The cap plate 30 may connect the inside and the outside if needed. For example, the cap plate 30 may include an electrolyte injection hole 32, through which an electrolyte is injected inside the closed and sealed case 20. The electrolyte injection hole 32 is sealed by a sealing cap 33 after the electrolyte is injected. The cap plate 30 may have a vent hole 35, with a vent plate 34 that is thinner than the cap plate 30 being welded in the vent hole 35. The vent plate 34 opens to discharge gas and prevent explosion of the rechargeable battery 100 when the internal pressure of the case 20 increases to be greater than a predetermined value, e.g., pressure resulting from gas that is generated by charging and discharging the electrode assembly 10.

In the example shown in FIG. 1 and FIG. 2, the electrode terminals 41 and 42 are installed in the terminal holes 311 and 312 respectively formed in the cap plate 30, and allow the anode 11 and the cathode 12 of the electrode assembly 10 to protrude to the outside.

One or both of the electrode terminals 41 and 42 may be electrically insulated from the cap plate 30. For example, the electrode terminals 41 and 42 may be installed in the terminal holes 311 and 312 by providing respective external insulators 431 and 432 and internal insulators 441 and 442. The terminal holes 311 and 312, the internal insulators 441 and 442, and the external insulators 431 and 432 may be formed in a like configuration at the two electrode terminals 41 and 42. Thus, the end electrode terminal 41, the terminal hole 311, the internal insulator 441, and the external insulator 431 will be described as an example. The external insulator 431 is partially inserted into the terminal hole 311 from the external side of the cap plate 30 to electrically insulate the electrode terminal 41 and the cap plate 30. Thus, the external insulator 431 insulates the external side of the electrode terminal 41 from the external side of the cap plate 30, and simultaneously insulates the external side of the electrode terminal 41 from the internal side of the terminal hole 311. The internal insulator 441 electrically insulates the cap plate 30 and the lead tab 51 corresponding to the terminal hole 311 inside the cap plate 30. Thus, the internal insulator 441 insulates the top side of the lead tab 51 and the inside of the cap plate 30.

Figure 3:
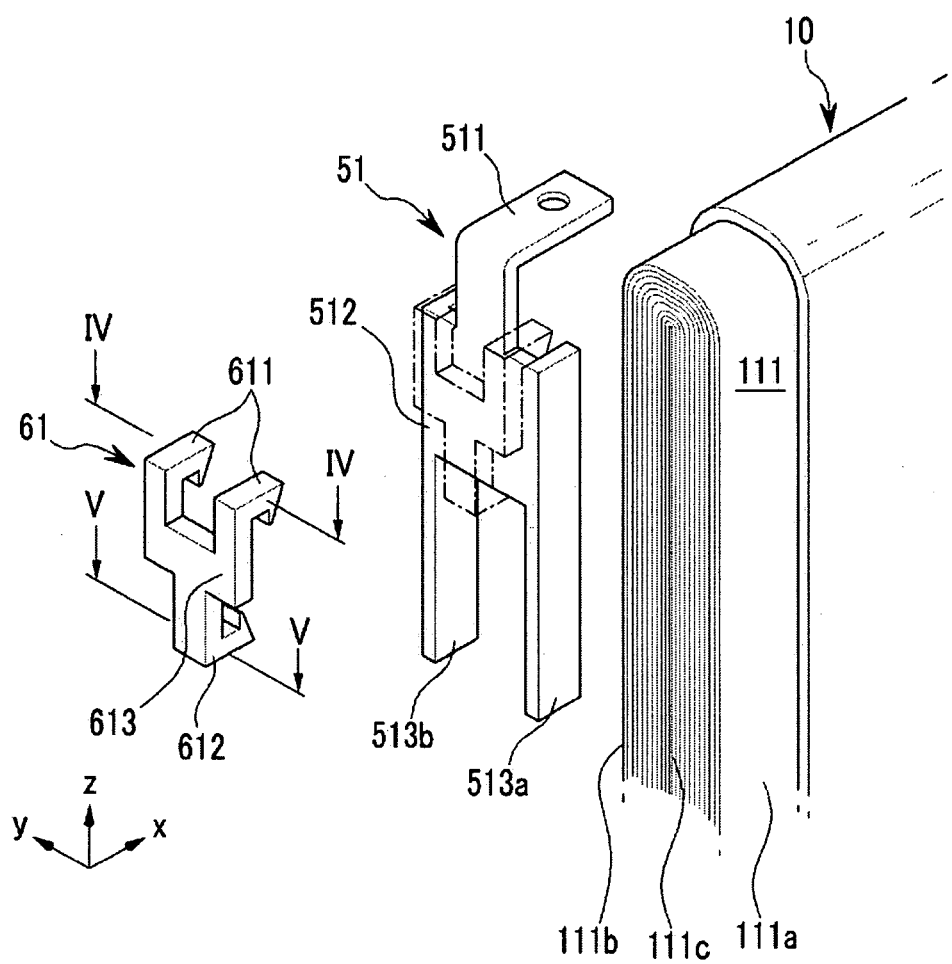
FIG. 3 illustrates an exploded perspective view of a retainer, a lead tab, and an electrode assembly in the rechargeable battery of the first example embodiment.

FIG. 3 illustrates an exploded perspective view of a retainer, a lead tab, and an electrode assembly in the rechargeable battery of the first example embodiment.

In the example shown in FIG. 3, the uncoated regions 111 and 121 and the respective retainers 61, 62 in the uncoated regions 111 and 121 are identically formed at the anode 11 and the cathode 12. Hence, only a part of the uncoated region 111 on the anode 11 is illustrated in FIG. 3, and the uncoated region 111 on the anode 11 will be described in the example below.

In the example shown in FIG. 3, the uncoated region 111 is continuously wound. Thus, the end face 111c of the uncoated region 111 is formed with lines that are gradually increased from a same center line. Thus, the lines at the end face 111c of the uncoated region 111 form a straight line unit that are formed as straight lines in the Z-axis direction and are overlapped in the X-axis direction, and form an arc unit that is connected as a semicircle or a semi-oval at both top and bottom ends of the straight line unit in the Z-axis direction and is overlapped in the Z-axis direction.

In the example shown in FIG. 3, the lead tab 51 includes a connector portion 511 connected to the electrode terminal 41, and includes a body portion 512 connected to the connector portion 511. The connector portion 511 may be connected to the electrode terminal 41 by, e.g., a caulking process, which is inserting one end of the electrode terminal 41 into a hole of the connector portion 511 and transforming the end of the electrode terminal 41.

In the example shown in FIG. 3, the body portion 512 faces the end face 111c of the uncoated region 111 of the electrode assembly 10. The lead tab 51 also includes a first current collector portion 513a connected to the body portion 512 and welded to a front side face 111a of the uncoated region 111, and a second current collector portion 513b connected to the body portion 512 and welded to a rear side face 111b of the uncoated region 111. The first and second current collector portions 513a, 513b may be directly fixed to the front side face 111a and the rear side face 111b, e.g., by welding, so as to have significant surface area contact with the uncoated region 111 and provide a low resistance electrical path.

In the example shown in FIG. 3, the connector portion 511 is provided between the cap plate 30 and the electrode assembly 10. The body portion 512 is connected to the connector portion 511, which is bent in the vertical direction from the horizontal direction to reach the end face 111c of the uncoated region 111. The body portion 512 is provided between the end face 111c of the uncoated region 111 and the case 20. The face of the body portion 512 defines one side of a gap G, described below.

In the example shown in FIG. 3, the current collectors 513a, 513b are respectively formed to be on a first X-Z plane corresponding to the front side face 111a and on a second X-Z plane corresponding to the rear side face 111b of the uncoated region 111, so as to be attached and welded to the front and rear side faces 111a, 111b, respectively, of the uncoated region 111. The first current collector portion 513a is provided between the front side face 111a of the uncoated region 111 and an inner front wall 20a of the case 20, and the second current collector portion 513b is provided between the rear side face 111b of the uncoated region 111 and an inner rear wall 20b of the case 20.

Figure 4:
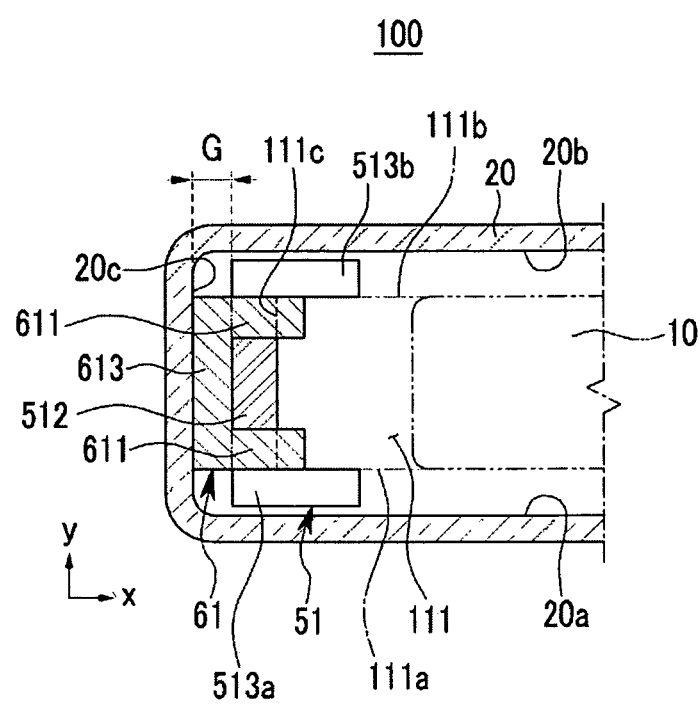
FIG. 4 illustrates a cross-sectional view in an X-Y plane with respect to a line IV-IV in FIG. 3.
Figure 5:
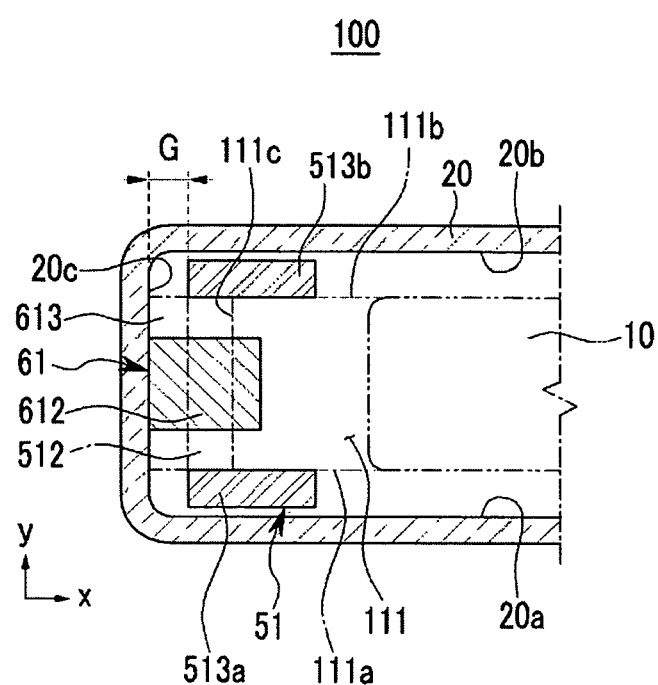
FIG. 5 illustrates a cross-sectional view in an X-Y plane with respect to a line V-V in FIG. 3.

FIG. 4 illustrates a cross-sectional view in an X-Y plane with respect to a line IV-IV in FIG. 3, and FIG. 5 illustrates a cross-sectional view in an X-Y plane with respect to a line V-V in FIG. 3.

In the example shown in FIGS. 3-5, the retainer 61 is disposed in the gap G, the gap G being a space between the lead tab 51 and the inner end wall 20c of the case 20 where the two face each other. The retainer 61 fixes the position of the electrode assembly 10 in the case 20. As described in detail below, in an implementation the retainer 61 fixes the position of the electrode assembly 10 with respect to movement along the X-axis relative to the case 20. In another implementation, the retainer 61 fixes the position of the electrode assembly 10 with respect to movement along the Y-axis relative to the case 20.

The retainer 61 may have a predetermined thickness. In the example shown in FIGS. 3-5, a thickness of the retainer 61 on the lead tab 51 is substantially the same as the dimension of the gap G along the X-axis. Thus, the gap G between the lead tab 51 and the inner end wall 20c of the case 20 is filled with the retainer 61. For example, the retainer 61 may be joined to, and in contact with, the lead tab 51, and may contact the inner wall 20c of the case 20. Therefore, the retainer 61 prevents the electrode assembly 10 from moving in the X-axis direction in the case 20. As a result, durability is improved by providing resistance to vibration of the electrode assembly 10 in the case 20, i.e., by minimizing movement of the electrode assembly 10 relative to the case 20. Further, the electric isolation between the case 20 and the uncoated region 111, and/or between the case 20 and the lead tab 51, is maintained. In contrast, a comparative battery wherein the retainer 61 is wrapped to the lead tab 51 and the electrode assembly 11 with an adhesive tape may not provide precise control over the thickness of the wrapped electrode assembly, such that installation into the case 20 may be difficult if too much tape is used, or the gap G may not be sufficiently filled if too little tape is used, allowing undesirable vibration and degrading the durability of the battery.

In the example embodiment shown in FIGS. 3-5, the retainer 61 is installed on the body portion 512 of the lead tab 51, and is provided between the body portion 512 and the case 20. The retainer 61 may be joined to the lead tab using, e.g., a mechanical interlocking system such as one or more hooks, which may locate in corresponding holes or openings of the lead tab 51. The retainer 61 may clip to the lead tab 51, and may thus be easy to install while ensuring both proper placement relative to the lead tab and proper thickness relative to the gap G. The retainer 61 may be joined only to the lead tab 51, which may provide for simpler assembly than, e.g., wrapping the lead tab 51 and the electrode assembly 11 together with an adhesive tape.

In an example implementation, the retainer 61 may be a monolithic member, e.g., a member molded from an electrically insulating polymer. The retainer 61 may be generally incompressible. In another implementation, the retainer 61 may include a main member having a resilient member on a face or faces thereof, the resilient member being formed of a material that is more easily compressed than the main member.

The retainer 61 may include a buffer 613 attached to the body portion 512 of the lead tab 51. The retainer 61 may include one or more first hooks 611 connected to the buffer 613 and hooked on the top of the body portion 512 (refer to FIG. 4), and includes a second hook 612 connected to the buffer 613 and hooked on the bottom of the body portion 512 (refer to FIG. 5). A pair of first hooks 611 may be hooked on the top of the body portion 512 adjacent to respective bottom sides of the connector portion 511. Thus, the retainer 61 may be stably installed at 3 points on the body portion 512 of the lead tab 51 by the pair of first hooks 611 and the second hook and 612. The retainer 61 may float with respect to the case 20, e.g., the retainer 61 may slide along the inner wall of the case 20, which may simplify installation of the electrode assembly 11.

As described above, a rechargeable battery may have a gap between an uncoated region of the electrode assembly and an inner wall of the battery case. The gap enables the electrode assembly to be freely inserted into the case, but it generates movement of the electrode assembly in the case after the insertion. Thus, if the gap between the uncoated region and the inner wall of the case is wide, insertion of the electrode assembly is easy, but durability to the vibration of the electrode assembly and an electric insulating property of the electrode assembly for the case may be deteriorated because of movement of the electrode assembly in the case. On the other hand, if the gap is narrow, insertion of the electrode assembly becomes difficult, but durability to the vibration and the electric insulating property of the electrode assembly can be improved. In this regard, embodiments provide a way to easily insert the electrode assembly into the case, while improving the vibration durability and electric insulating property of the electrode assembly.

Figure 6:
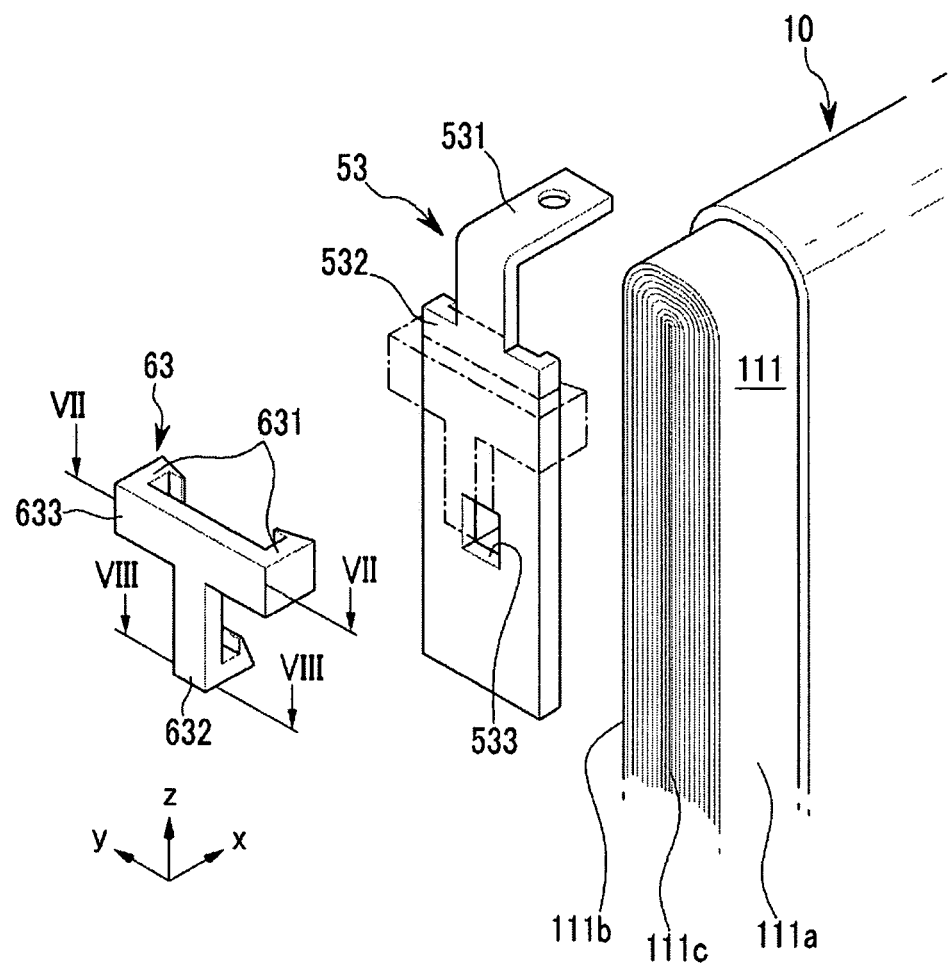
FIG. 6 illustrates an exploded perspective view of a retainer, a lead tab, and an electrode assembly in a rechargeable battery according to a second example embodiment.
Figure 7:
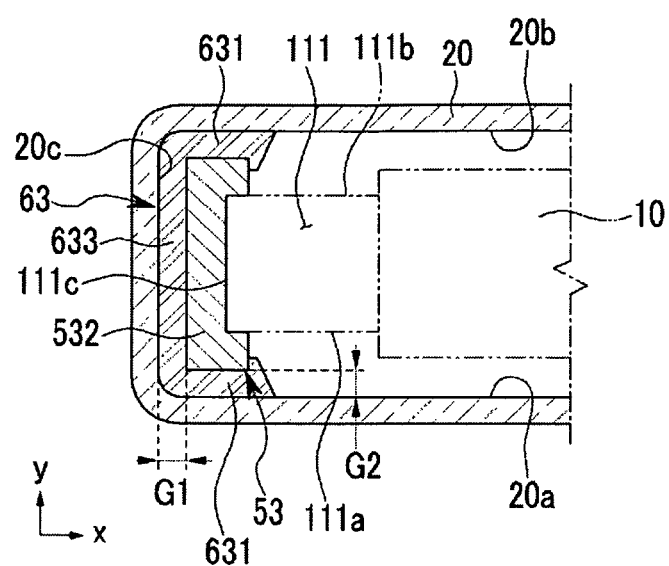
FIG. 7 illustrates a cross-sectional view in an X-Y plane with respect to a line VII-VII in FIG. 6.
Figure 8:
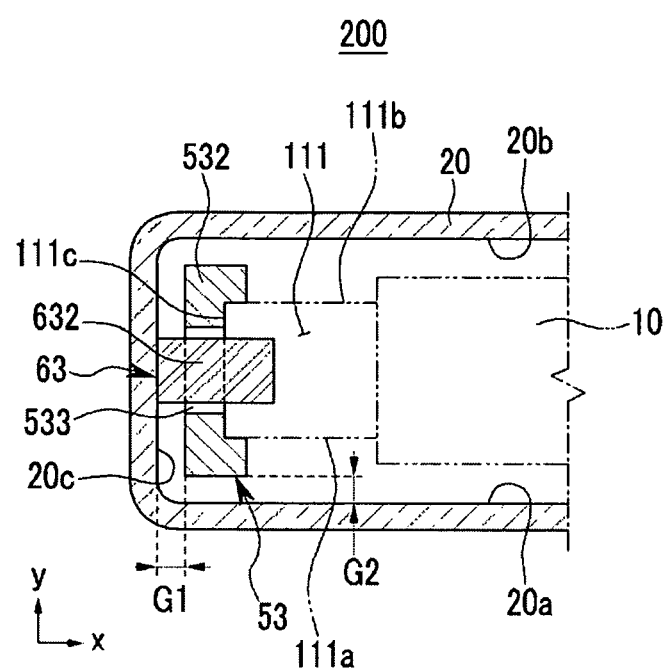
FIG. 8 illustrates a cross-sectional view in an X-Y plane with respect to a line VIII-VIII in FIG. 6.

FIG. 6 illustrates an exploded perspective view of a retainer, a lead tab, and an electrode assembly in a rechargeable battery according to a second exemplary embodiment of the present invention, FIG. 7 illustrates a cross-sectional view in an X-Y plane with respect to a line VII-VII in FIG. 6, and FIG. 8 illustrates a cross-sectional view in an X-Y plane with respect to a line VIII-VIII in FIG. 6.

Referring to FIG. 6, FIG. 7, and FIG. 8, in a rechargeable battery 200 according to the second exemplary embodiment, a lead tab 53 includes a connector portion 531 connected to the electrode terminal 41, and includes a current collector portion 532 connected to the connector portion 531 and welded at the end face 111c of the uncoated region 111 of the electrode assembly 10. For example, the connector portion 531 may be connected to the electrode terminal 41 by a caulking process (inserting one end of the electrode terminal 41 into a hole of the connector portion 531 and transforming the end of the electrode terminal 41), and is provided between the cap plate 30 and the electrode assembly 10. The current collector portion 532 is connected to the connector portion 531, which is bent in the vertical direction from the horizontal direction to reach the end face 111c of the uncoated region 111, and is provided between the end face 111c of the uncoated region 111 and the inner end wall 20c of the case 20.

A retainer 63 is disposed at the gap G that is set between the lead tab 53 and the inner end wall 20c of the case 20 facing each other, and fixes the position of the electrode assembly 10 in the case 20. Thus, the gap G between the lead tab 53 and the inner end wall 20c of the case 20 is filled with the retainer 63. Therefore, the retainer 63 prevents the electrode assembly 10 from moving in the x-axis direction in the case 20. As a result, durability is improved by providing resistance to vibration of the electrode assembly 10 in the case 20, and the electric isolation between the case 20 and the uncoated region 111, or between the case 20 and the lead tab 53, is improved.

In the example embodiment shown in FIGS. 6-8, the retainer 63 is installed on the current collector portion 532 of the lead tab 53, and is provided between the current collector portion 532 and the case 20. In an example implementation, the retainer 63 includes a buffer 633 attached to the current collector portion 532, includes one or more first hooks 631 connected to the buffer 633 and hooked on the sides of the current collector portion 532, and a second hook 632 connected to the buffer 633 and hooked in an installing hole 533 of the current collector portion 532. A pair of first hooks 631 may be hooked on the current collector portion 532 at both sides of the current collector portion 532. Thus, the retainer 63 may be stably installed at 3 points on the current collector portion 532 of the lead tab 53 by the first hooks 631 and the second hook 632. In this instance, the first hooks 631 are provided between respective sides of the current collector portion 532 and the case 20 (refer to FIG. 7), and the second hook 632 is provided between the current collector portion 532 and the case 20 (refer to FIG. 8).

Compared to the retainer 61 according to the first example embodiment, the retainer 63 according to the second example embodiment is filled as the buffer 633 in a gap G1 (which is set between the current collector portion 532 facing the end face 111c of the uncoated region 111 and the inner end wall 20c of the case 20), and is simultaneously filled as the first hook 631 in gaps G2 (which are set between respective ends of the current collector portion 532 and the corresponding inner front and rear walls 20a, 20b of the case 20), to thereby fix the position of the electrode assembly 10 in the case 20. Thus, the retainer 63 prevents the electrode assembly 10 from moving in the x-axis and y-axis direction in the case 20. Hence, durability is improved by providing resistance to vibration of the electrode assembly 10 in the case 20, and the electric isolation between the case 20 and the uncoated region 111, or between the case 20 and the lead tab 53, is improved.

Figure 9:
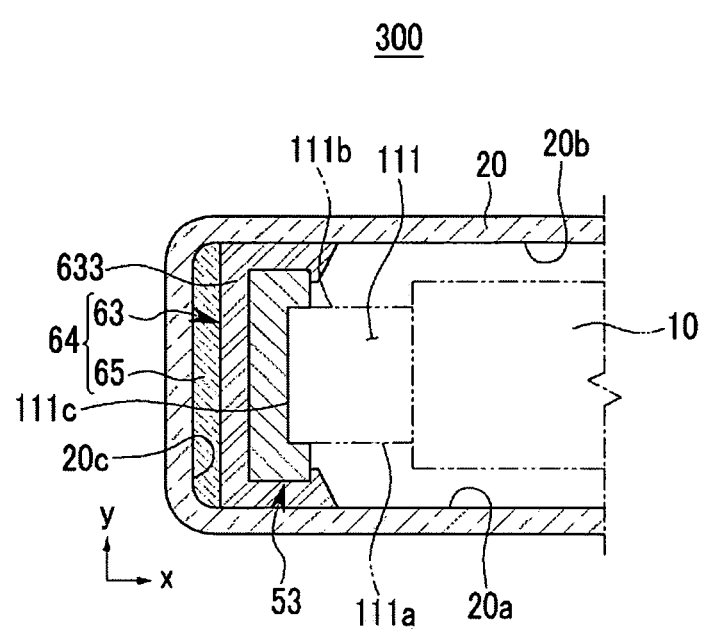
FIG. 9 illustrates a cross-sectional view of a rechargeable battery according to a third example embodiment.

FIG. 9 illustrates a cross-sectional view of a rechargeable battery according to a third example embodiment of the present invention.

Referring to FIG. 9, in a rechargeable battery 300 according to the third exemplary embodiment, a retainer 64 further includes a buffer member 65 between a buffer 633 of the retainer 63 according to the second exemplary embodiment and the inside of the case 20. For example, the buffer member 65 may be formed with a resilient member such as a foaming resin, a spring, or an elastic member. The resilient member may minimize movement of the retainer 64 by pressing against the inside of the case 20. The rechargeable battery 300 according to the third exemplary embodiment discloses the configuration of the retainer 64 which is given by further adding the buffer member 65 to the retainer 63 according to the second exemplary embodiment, and it is also possible to apply a buffer member to the buffer 613 of the retainer 61 according to the first exemplary embodiment.

Figure 10:
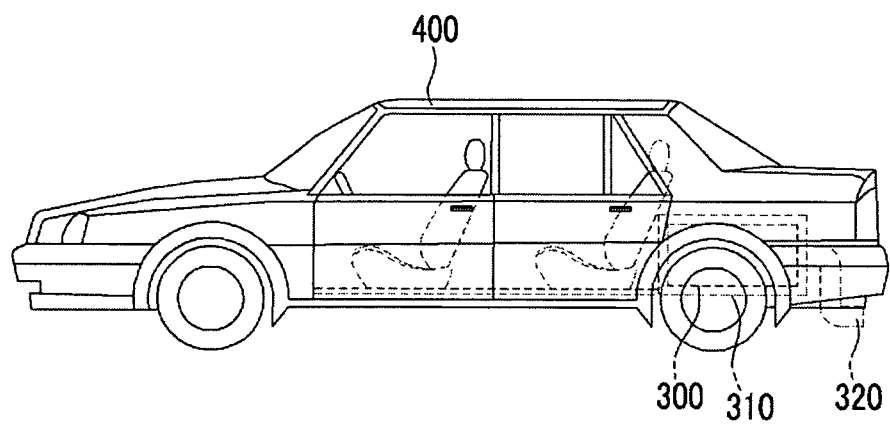
FIG. 10 illustrates a schematic diagram of a vehicle including a rechargeable battery according to an embodiment.

FIG. 10 illustrates a schematic diagram of a vehicle including a rechargeable battery according to an embodiment of the present invention. The vehicle may be, e.g., a hybrid electric vehicle, and all-electric vehicle, etc. The vehicle may include a power source that provides a motive power for the vehicle, as well as the rechargeable battery 300 described above. The rechargeable batteries 100 and 200 described above may be similarly used. A plurality of rechargeable batteries may be configured as a battery pack that provides electricity to and/or receives electricity from the power source. The rechargeable battery 300 may be housed in a housing 310, which may include a vent 320 to release gases, provide air flow to the rechargeable battery 300, etc.

As described above, embodiments provide a way to fix the position of the electrode assembly in the case without hindering insertion of the electrode assembly. A rechargeable battery according to an example embodiment may include a retainer, which may be formed of an electrically insulating material, between the lead tab and the case. Therefore, durability to the vibration of the electrode assembly in the case is improved, and the electrical insulating property between the case and the uncoated region is improved. The rechargeable battery may control a position of the electrode assembly relative to one or more inner walls of the case, while allowing easy insertion of the electrode assembly into the case.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A battery, comprising:
 a case defining an inner space, the case having an inner wall;
 an electrode assembly in the inner space, the electrode assembly including an uncoated region;
 a lead tab configured to carry electricity, the lead tab being connected to the uncoated region, the lead tab including a connector portion connected to an electrode terminal and a body portion facing an end face of the uncoated region; and
 a retainer between the electrode assembly and the inner wall and having a predetermined thickness, the retainer having a Y-shaped or T-shaped body, and the retainer being joined to the body portion of the lead tab by a plurality of hooks that extend from the Y-shaped or T-shaped body of the retainer to interlock with the body portion of the lead tab.

2. The battery as claimed in claim 1, wherein:
 the battery includes a first gap between the lead tab and an end of the inner wall, and
 the retainer is disposed in the first gap.

3. The battery as claimed in claim 2, wherein:
 the battery includes a second gap between the lead tab and a side of the inner wall, and
 the retainer is disposed in the second gap.

4. The battery as claimed in claim 1, wherein the retainer is formed of an insulating material.

5. The battery as claimed in claim 1, wherein the retainer is a monolithic unit formed of an insulating material.

6. The battery as claimed in claim 1, wherein the retainer includes an insulating material on a surface that contacts the inner wall.

7. The battery as claimed in claim 1, wherein the retainer includes a resilient member on a surface that faces the inner wall.

8. The battery as claimed in claim 7, wherein the resilient member is a foam member, a spring, or an elastic member.

9. The battery as claimed in claim 1, wherein the retainer is slidable with respect to the inner wall.

10. The battery as claimed in claim 1, wherein:
the plurality of hooks includes at least one first hook and a second hook, the second hook opposing the at least one first hook, and
the retainer grips the lead tab between the at least one first hook and the second hook.

11. The battery as claimed in claim 10, wherein:
the uncoated region includes a front side face and a rear side face, and
the lead tab includes a first current collector portion fixed to the front side face and a second current collector portion fixed to the rear side face.

12. The battery as claimed in claim 10, wherein:
the lead tab includes at least one opening for receiving one of plurality of hooks of the retainer, and
the one of the plurality of hooks of the retainer is disposed in the opening.

13. The battery as claimed in claim 12, wherein the opening is a hole.

14. The battery as claimed in claim 13, wherein:
the uncoated region includes an end, and
the lead tab includes a current collecting portion fixed to the end.

15. A vehicle, comprising:
a power source, the power source providing a motive power for the vehicle; and
at least one rechargeable battery configured to provide electricity to the power source, the at least one rechargeable battery including:
a case defining an inner space, the case having an inner wall;
an electrode assembly in the inner space, the electrode assembly including an uncoated region;
a lead tab configured to carry electricity, the lead tab being connected to the uncoated region, the lead tab including a connector portion connected to an electrode terminal and a body portion facing an end face of the uncoated region; and
a retainer between the electrode assembly and the inner wall and having a predetermined thickness, the retainer having a Y-shaped or T-shaped body and the retainer being joined to the body portion of the lead tab by a plurality of hooks that extend from the Y-shaped or T-shaped body of the retainer to interlock with the body portion of the lead tab.

* * * * *